(12) United States Patent
Iwaki (10) Patent No.: US 11,303,782 B2
(45) Date of Patent: Apr. 12, 2022

(54) IMAGE FORMING APPARATUS WITH COLOR ADJUSTMENT

(71) Applicant: TOSHIBA TEC KABUSHIKI KAISHA, Tokyo (JP)

(72) Inventor: Kiyoshi Iwaki, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/893,971

(22) Filed: Jun. 5, 2020

(65) Prior Publication Data

US 2021/0058532 A1 Feb. 25, 2021

(51) Int. Cl.
*H04N 1/60* (2006.01)
*H04N 1/00* (2006.01)
*H04N 1/04* (2006.01)

(52) U.S. Cl.
CPC ....... *H04N 1/6075* (2013.01); *H04N 1/00206* (2013.01); *H04N 1/00411* (2013.01); *H04N 1/04* (2013.01)

(58) Field of Classification Search
None
See application file for complete search history.

(56) References Cited

U.S. PATENT DOCUMENTS

| 6,134,029 A | * | 10/2000 | Granger | ............... | H04N 1/6033 358/504 |
| 2005/0190390 A1 | * | 9/2005 | Yamada | ............... | H04N 1/6058 358/1.9 |
| 2012/0081441 A1 | * | 4/2012 | Miyake | ................ | H04N 1/4015 347/15 |
| 2014/0043628 A1 | * | 2/2014 | Kishino | ............. | G06K 15/1878 358/1.9 |

FOREIGN PATENT DOCUMENTS

JP 2008236760 A 10/2008
JP 2008293082 A 12/2008

* cited by examiner

*Primary Examiner* — Andrew H Lam
(74) *Attorney, Agent, or Firm* — Kim & Stewart LLP (57) ABSTRACT

A image forming apparatus includes a display, a user input device, a printer unit, and a processor. The processor causes a color patch image output screen to be displayed. The color patch image output screen includes user selectable hues. Once the hue selection is received a color patch image based on the hue selection is displayed. The color patch image includes several different colors indexed by a color number value. A color patch number input screen is then displayed and includes a color to be adjusted input field and a target color input field. User inputs for a first color patch number and a second color patch number are received via the displayed screen. The processor then performs a color conversion such that the first color patch number corresponds to the second color patch number when the printer unit prints an image using the image data.

20 Claims, 5 Drawing Sheets

IMAGE FORMING APPARATUS WITH COLOR ADJUSTMENT

CROSS-REFERENCE TO RELATED APPLICATIONS

This application is based upon and claims the benefit of priority from Japanese Patent Application No. 2019-152305, filed on Aug. 22, 2019, the entire contents of which are incorporated herein by reference.

FIELD

Embodiments of the present disclosure relate to an image forming apparatus and a method of controlling an image forming apparatus.

BACKGROUND

The output results from image forming apparatuses, such as multifunction peripherals (MFPs) may be different from each other. For this reason, for example, a specific color on the printed output may not exactly match the user's preference or expectations when one image forming apparatus is replaced by another image forming apparatus.

There is a known method of measuring a color value on printed matter by a colorimetric apparatus and comparing the measured color value to an adjustment target value, and then adjusting of the color output of the image forming apparatus according to a color conversion table or the like. However, this method is not easy because it requires specialized equipment such as a colorimetric apparatus.

DETAILED DESCRIPTION

Embodiments provide an image forming apparatus capable of performing color adjustment and to provide for controlling image forming apparatuses accordingly for performing such color adjustments.

According to one embodiment, an image forming apparatus includes a display, a user input device for receiving user selections, a printer unit configured to print images on a print medium according to image data, and a processor. The processor is configured to display a color patch image output screen on the display. The color patch image output screen includes user selectable hues. The processor receives a selection of a hue from a user via the user input device and then outputs a color patch image based on the received selection of the hue. The color patch image includes a plurality of colors indexed by a color number value. The processor then causes a color patch number input screen to be displayed on the display. Then color patch number input screen includes a color to be adjusted input field and a target color input field. The processor then receives a user input of a first color patch number in the color to be adjusted input field and a user input of a second color patch number in the target color input field. The first and second color patch numbers are each color number values from the color patch image. The processor then performs a color conversion on image data such that the first color patch number corresponds to the second color patch number when the printer unit prints an image on the print medium according to the image data.

Hereinafter, an image forming apparatus according to an example embodiment will be described with reference to the drawings.

Figure 1:
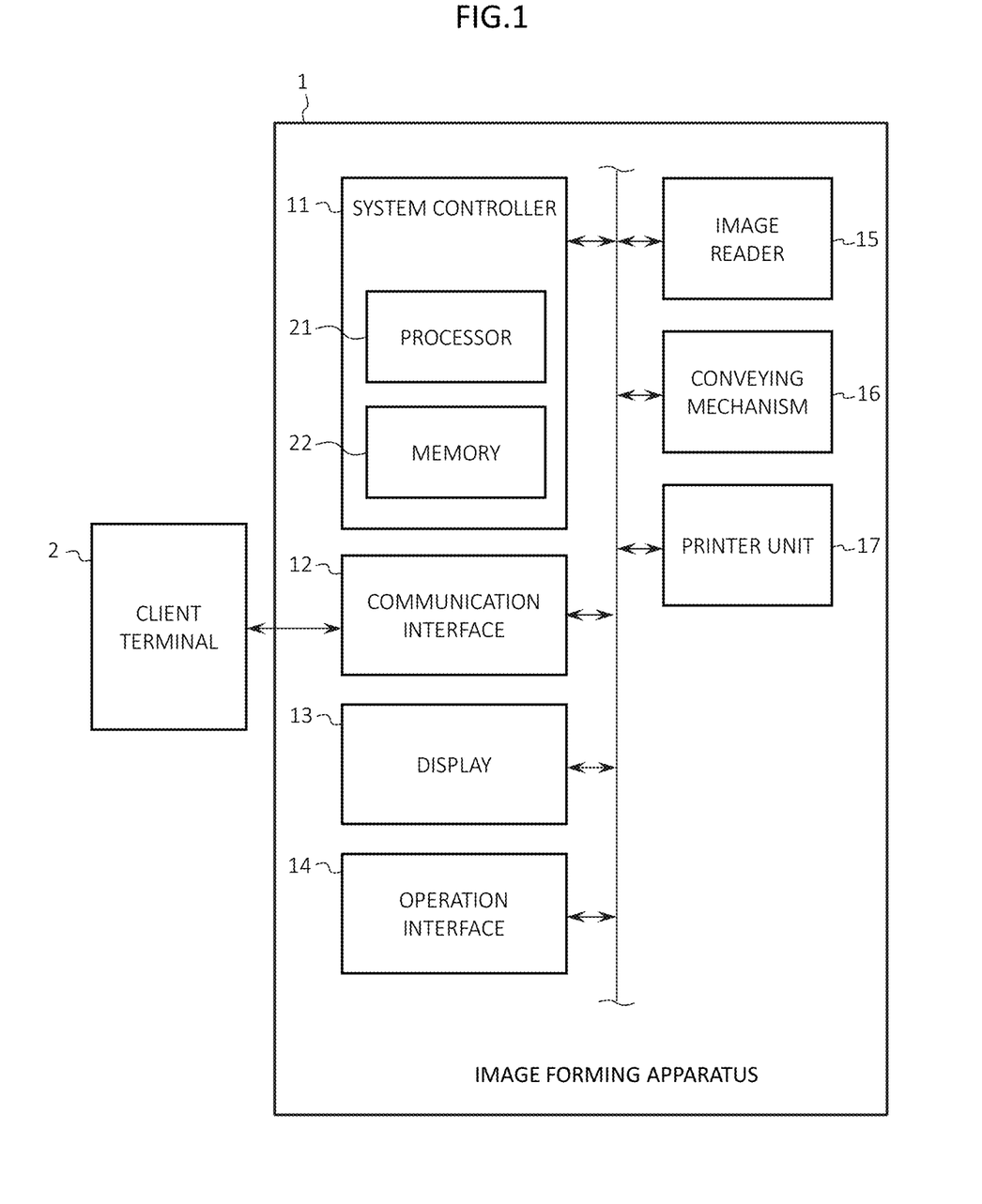
FIG. 1 is a diagram of an image forming apparatus according to an embodiment.

FIG. 1 depicts an image forming apparatus 1 according to an embodiment.

The image forming apparatus 1 is a multi-function printer (MFP) that performs various processes such as image formation on sheets of paper or the like. The image forming apparatus 1 of this example is a solid-state scanning type printer (for example, an LED printer) that scans an LED array during the image formation while a recording medium, such as a sheet of paper, is conveyed past a print head or the like. In other examples, the image forming apparatus 1 may be an ink jet printer or a printer of another type.

The image forming apparatus 1 electrostatically charges the photosensitive drum, then selectively irradiates the photosensitive drum with light in a pattern corresponding the image data. The selective irradiation of the photosensitive drum forms an electrostatic latent image on the photosensitive drum's outer surface. The electrostatic latent image corresponds to the image data being printed. The image forming apparatus 1 next attaches toner to the electrostatic latent image that has been formed on the photosensitive drum. The toner adhering to the latent image on the photosensitive drum forms a toner image which is subsequently transferred to a print medium (e.g., a sheet of paper). The image forming apparatus 1 next fixes the toner image to the print medium by applying heat and pressure.

The image forming apparatus 1 can be connected to a client terminal 2 (such as a personal computer, a notebook PC, a smartphone, or a tablet PC) which supplies a print job including image data for printing via a network or the like.

Image forming apparatus 1 includes a system controller 11, a communication interface 12, a display 13, an operation interface 14, an image reader 15, a conveying mechanism 16, and a printer unit 17 (also referred to as an image forming portion). The system controller 11, the communication interface 12, the display 13, the operation interface 14, the image reader 15, the conveying mechanism 16, and the printer unit 17 are accommodated together in a housing.

The system controller 11 provides overall control of image forming apparatus 1. The system controller 11 includes, for example, a processor 21 and a memory 22.

The processor 21 is an arithmetic element (for example, a CPU or the like). The processor 21 can execute program instructions for providing the functions of the system controller 11. The processor 21 performs various processes on the basis one or more programs stored in the memory 22 and data stored in the memory 22. The processor 21 functions as a control unit or controller capable of executing various operations by executing a program stored in the memory 22.

The memory 22 is a storage device for storing programs and data used by the programs. The memory 22 temporarily stores data or the like that is being processed by the processor 21. The memory 22 is a nonvolatile memory in this example.

The communication interface 12 permits communication with the client apparatus 2 or the like via a network.

The display 13 displays screens in accordance with a video signal from a display control unit, such as a system controller 11 or a graphics or video controller. For example, display 13 displays screens according to various settings of image forming apparatus 1 or for receiving various operator input.

The operation interface 14 includes various input operation elements permitting user input to be received. The operation interface 14 supplies signals corresponding to the operation of the various input operation elements to the system controller 11. The input operation elements may be, for example, a touch sensor, a numeric keypad, a power button, a paper feed key, various function keys, and/or a keyboard. The touch sensor may be, for example, a resistive touch sensor, a capacitive touch sensor, or the like. The touch sensor acquires information indicating a position pressed by user in a certain region. The touch sensor can be configured as a touch panel integrally with the display 13, so that a signal indicating a touched position on a screen displayed on the display 13 is input to the system controller 11.

The image reader 15 scans an image from a document or the like. The image reader 15 includes, for example, a scanner and an automatic document feeder (ADF). The scanner reads a document placed on a glass platen of a scanner bed or document table on which the document to be scanned is placed. The image reader 15 acquires an image of the document by, for example, acquiring an image by a moving scanner. In some examples, the image reader 15 acquires an image of the document by moving the document past a reading position of a fixed scanner.

The conveying mechanism 16 supplies a print medium to the printer unit 17, and then ejects the print medium from the housing after the image has bene formed on the print medium by the printer unit 17. The conveying mechanism 16 supplies a print medium from a sheet cassette or the like to the printer unit 17. The conveying mechanism 16 discharges the print media to a paper discharge tray or the like outside the housing after printing.

The printer unit 17 forms an image on the print medium based on the control of the system controller 11. The printer unit 17 includes a print process unit, an exposure unit, a transfer mechanism, and a fixing unit. The printer unit 17 includes a print process unit and an exposure unit for each color of toner available for the image forming apparatus 1. The color of the toners are, for example, cyan (C), magenta (M), yellow (Y), black (K), or the like. The printer unit 17 fixes a toner image for each color of CMYK to the print medium, thereby forming a color image on the medium.

Each print process unit includes a photosensitive drum, an electrostatic charger, and a developing device.

The photosensitive drum includes a photoreceptor on a cylindrical drum. A photosensitive layer is formed on the outer peripheral surface of the drum. The photosensitive drum is rotated at a constant speed by a driving mechanism.

Electrostatic charger charges the surface of the photosensitive drum uniformly. For example, charger uses a charging roller to a uniformly apply negative potential to the photosensitive drum.

The developing device is an apparatus that attaches toner to the photosensitive drum. The developing device includes a developer container, a stirring mechanism, a developing roller, a doctor blade, and the like.

The developer container is a container for receiving and accommodating a toner discharged from a toner cartridge. Carrier particles are also in the developer container. The toner from the toner cartridge is mixed with the carrier by an agitator/stirrer mechanism. Typically, the carrier particles are loaded into the developer container when the developing device is manufactured.

The developing roller rotates in the developer container to adhere the developer to the surface. The doctor blade is a member disposed at a predetermined distance from the surface of the developing roller. The doctor blade removes an excess portion of the developer adhering to the surface of the rotating developing roller. As a result, a layer of the developer having a uniform thickness corresponding to the distance between the doctor blade and the surface of the developing roller is formed on the surface of the developing roller.

The exposure unit includes a plurality of light emitting elements. The exposure unit irradiates the photosensitive drum with light from the light emitting elements to form a latent image on the photosensitive drum. The light emitting elements are, for example, light emitting diodes (LEDs) or the like. In this example, each light emitting elements is configured to emit light on to one portion of the photosensitive drum. The plurality of light emitting elements are arranged along the main scanning direction which is parallel to the rotation axis of the photosensitive drum.

The plurality of light emitting elements arranged form one line (row) of the latent images on the photosensitive drum at a time. The latent image is then formed line-by-line as the photosensitive drum rotates (in the sub-scanning direction).

When the layer of developer formed on the surface of the developing roller is brought adjacent to the surface of the photosensitive drum, toner contained in the developer adheres to the latent image formed on the photosensitive drum. As a result, a toner image corresponding to the latent image is formed on the surface of the photosensitive drum.

The transfer mechanism transfers the toner image from the photosensitive drum to a print medium. The transfer mechanism can include a primary transfer belt to first receive the toner image from the photosensitive drum, a secondary transfer roller, and a plurality of other rollers as necessary for movement of the transfer belt and print media. The transfer mechanism conveys the toner image on the primary transfer belt to a transfer nip at which the secondary transfer roller the primary transfer belt are in close proximity with each other. The transfer mechanism transfers the toner image from the primary transfer belt to the print medium by passing a print medium, supplied by the conveying mechanism 16, through the transfer nip in coordination with the primary transfer belt.

The fixing unit then fixes the toner image that has been transferred to the print medium on to the print medium. The fixing unit includes a heated element (e.g., a heated roller) for heating the print medium, a pressing member (press roller) for applying pressure to the print medium, and a heater for heating the heated element. The press roller forms a fixing nip at which the press roller and the heat roller are brought into close proximity with each other. The fixing unit applies heat and pressure to the print medium at the fixing nip. Thus, the fixing unit fixes the transferred toner image to the print medium. The print medium that has passed through the fixing nip is then discharged to the discharge tray by the conveying mechanism 16.

Next, a description will be given of the color adjustment processing in the image forming apparatus 1.

The processor 21 of the system controller 11 performs color conversion on image data used to form the toner image based on color conversion information set in advance (that is, pre-stored or predetermined color conversion information). The processor 21 controls the printer unit 17 to form an image on the medium based on the color-converted image data.

The color conversion information is information (such as color conversion equations or tables) for converting an input color value (a color to be adjusted) to another color (adjustment target color). The "color to be adjusted" and the "adjustment target color" are selected based on input received via the operation interface 14 or the like.

For example, the processor 21 generates a color conversion table for converting a "color to be adjusted" to an "adjustment target color" based on the selected "color to adjust" and the "adjustment target". The processor 21 stores the generated color conversion table in the memory 22. The processor 21 performs color adjustment processing on the image data by using the color conversion table stored in the memory 22.

For example, if the color of the printed matter output is unintentionally changed by the exchange of one image forming apparatus for another, the color of the printed matter from the new image forming apparatus (hereinafter referred to as the first device) can be selected to be the "color to be adjusted" to permit the user to select the color of the printed matter output from the old image forming apparatus (hereinafter, referred to as the second device) as the "adjustment target color". Thus, a color that has been changed by exchanging the second device for the first device can be brought closer to the color of the printed matter from the second device by a color adjustment processing.

Figure 2:
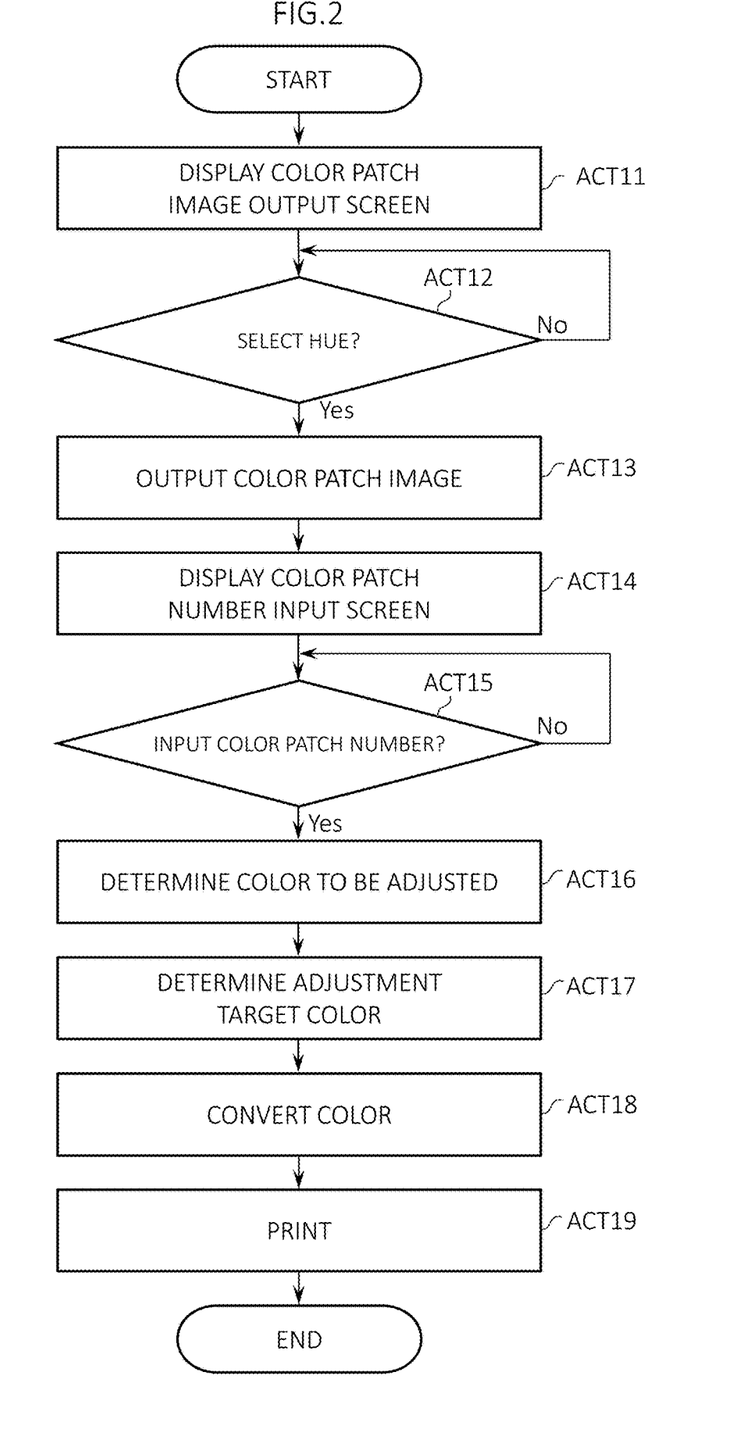
FIG. 2 is a flowchart of an operation of an image forming apparatus according to an embodiment.

FIG. 2 is an explanatory diagram for explaining the color adjustment processing.

Figure 3:
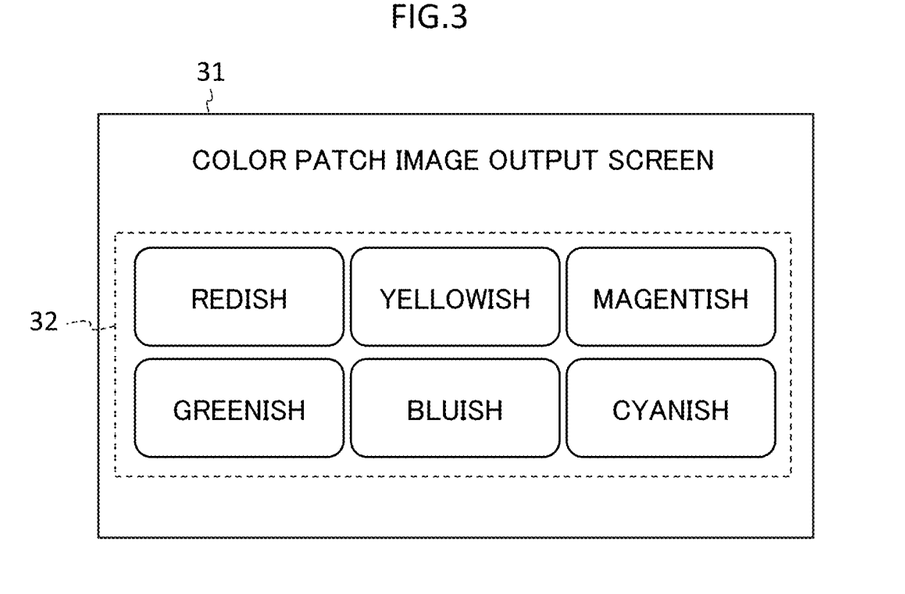
FIG. 3 depicts a color patch image output screen for an image forming apparatus according to an embodiment.

When the processor 21 receives an instruction from the operation interface 14 instructing that a color adjustment processing be performed, the processor 21 displays a color patch image output screen 31, as shown in FIG. 3, on the display 13 (ACT 11).

FIG. 3 depicts an example of a color patch image output screen 31.

Figure 4:
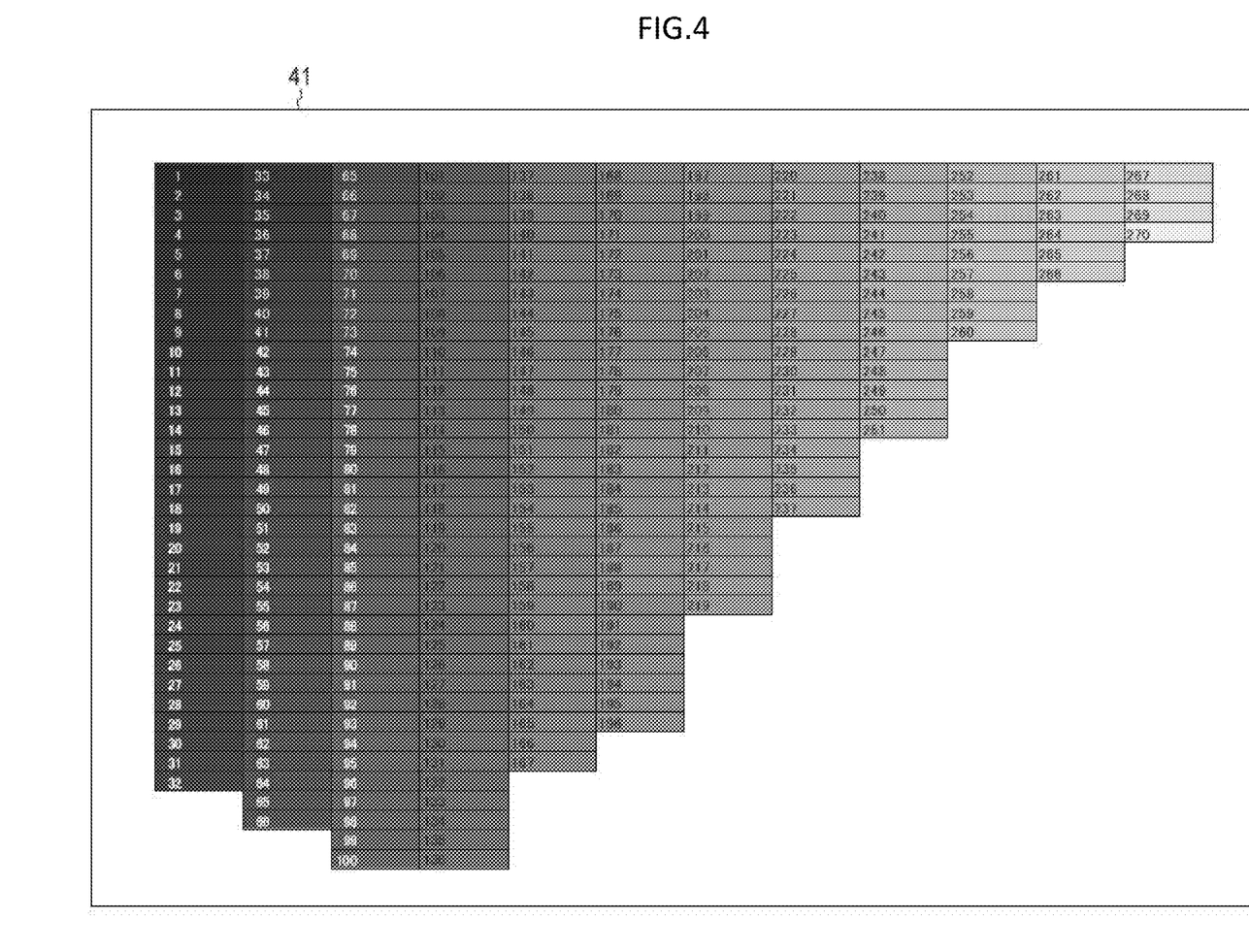
FIG. 4 depicts a color patch image for an image forming apparatus according to an embodiment.

The color patch image output screen 31 is a screen (user interface) outputting a color patch image 41 as shown in FIG. 4. A hue selection menu 32 for selecting a hue to output a color patch image is displayed on the color patch image output screen 31.

While the color patch image output screen 31 is displayed, the processor 21 determines whether or not any hue has been selected in the hue selection menu 32 (ACT 12).

FIG. 4 depicts an example of a color patch image 41.

The color patch image 41 is obtained by associating a plurality of color patches with different densities and a color patch number. The color patch image 41 is an image for indicating any arbitrary color on a print medium. The color patch number is information for identifying a particular color patch. The color patches of the color patch image 41 are arranged, for example, in the order of density (for example, from a dark color to a lighter color). The color patch of the color patch image 41 is arranged by arranging closer, more similar colors together. The color patch number is composed of, for example, index numbers of 1 to 270. The color patch image 41 is generated for each hue, for example, and stored in the memory 22. For example, the color patch image 41 can be generated in advance for each hue such as "redish", "greenish", "bluish", "yellowish", "cyanish", and "magentish". A color patch image 41 having a different hue may also be included in the color patch image in some examples. Further, a color patch may be arranged in any order.

When it is determined in ACT 12 that a particular hue has been selected in the hue selection menu 32 (ACT 12, YES), the processor 21 controls the printer unit 17 and the conveying mechanism 16 so as to output the color patch image 41 corresponding to the selected hue. (ACT 13). That is, the processor 21 controls the printer unit 17 and the conveying mechanism 16 so that the color patch image associated with the selected hue is read from the memory 22 and printed on the print medium in the color patch image 41 for each hue that has been generated in advance.

Figure 5:
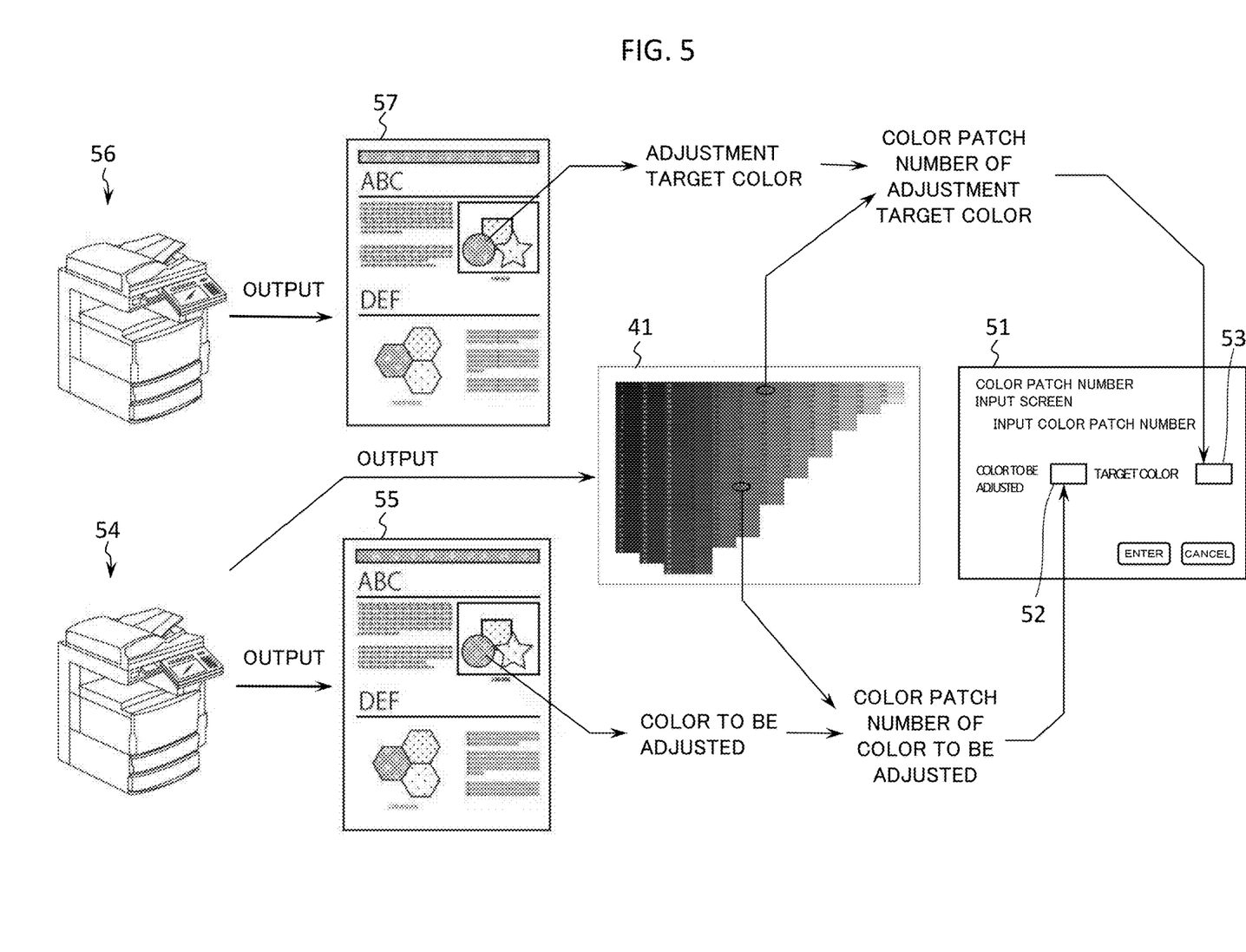
FIG. 5 is a diagram for explaining an example of color adjustment processing in an image forming apparatus according to an embodiment.

Upon outputting the color patch image 41, the processor 21 displays the color patch number input screen 51, shown in FIG. 5, on the display 13 (ACT 14).

FIG. 5 is an explanatory diagram for explaining input operations associated with the color patch number input screen 51.

The color patch number input screen 51 includes a first input field 52 for inputting a "color to be adjusted" and a second input field 53 for inputting an "adjustment target color". The first input field 52 and the second input field 53 are configured to be able to input color patch numbers provided on the color patch image 41 by using the operation interface 14.

When the color patch number input screen 51 is being displayed, the processor 21 determines whether or not the "color to be adjusted" and the "adjustment target color" have been input to the first input field 52 and the second input field 53, respectively (ACT 15).

In this example, it is assumed that the second printed matter 55 is output from the first device 54, the first printed matter 57 is output from the second device 56, and the "color to be adjusted," which is an any color on the second printed matter 55, is approximated to "adjustment target color," which is a corresponding color on the first printed matter 57. In this case, the user inputs the color patch number associated with the color patch closest to the "color to be adjusted" on the second printed matter 55 into the first input field 52. The user inputs the color patch number corresponding to the color patch closest to the "adjustment target color" on the first printed matter 57 into the second input field 53. That is, the first device 54 request the user to select "the color to be adjusted" on the second printed matter 55 from the first device 54 and the "adjustment target color" on the first printed matter 57 from the second device 56. The color patch number closest to the "adjustment target color" is input to the second input field 53 on color patch number input screen 51.

The processor 21 determines the color value of the "color to be adjusted" based on the color patch number input to the first input field 52 of the color patch number input screen 51 (ACT 16).

The processor 21 determines the color value of "adjustment target color" based on the color patch number input to the second input field 53 of the color patch number input screen 51 (ACT 17).

The color value is a value used for specifying a particular color. The color value can be, for example, a RGB value represented by red (R), green (G), and blue (B) values in a RGB color space. In some examples, the color value may be a CMY value represented by cyan (C), magenta (M), or yellow (Y) values in a CMY color space. In still other examples, the color value may be a CMYK value defined in CMYK color space for which a value for black (K) is further added to cyan (C), magenta (M), and yellow (Y) values.

The processor 21 performs color conversion to convert the color value of the "color to be adjusted" into the color value of "adjustment target color" (ACT 18). In this color conversion, the processor 21 generates color conversion information for translating or matching the color value of the "color to be adjusted" to the color value of "adjustment target color".

Here, a description will be given of an example in which the color value of the "color to be adjusted" and the color value of "adjustment target" are RGB values, but the image data supplied to the printer unit 17 is a CMYK value. In this case, the processor 21 generates a first color conversion table, a second color conversion table, and a third color conversion table as color conversion information. The first color conversion table, the second color conversion table, and the third color conversion table are each configured, for example, as a Look Up Table (LUT).

The first color conversion table is a table for converting the RGB value of the "color to be adjusted" into the RGB value of the "adjustment target color".

The second color conversion table is a table for converting RGB values of "adjustment target color" into CMYK values. The second color conversion table is a table that is often used in normal printing and copying, and is typically stored in the memory 22 in advance.

The third color conversion table is a table for converting the RGB value of the "color to be adjusted" into the CMYK value of the "adjustment target color".

The processor 21 first generates a first color conversion table for converting the RGB value of the "color to be adjusted" into the RGB value of "adjustment target color". For example, in the RGB color space, the processor 21 performs grid point adjustment for moving RGB values of the "color to be adjusted" (grid points) and RGB values included in an arbitrary adjustment range around the RGB value of the "color to be adjusted" to RGB values around the RGB value (grid point) of "adjustment target color". Thereby, a color selected as a "color to be adjusted" by the user and a first color conversion table that approximates the color selected as the "adjustment target color" to the approximate color thereof are generated.

Processor 21 then reads the second color conversion table, combines it with a first color conversion table, and generates a third color conversion table. For example, the processor 21 uses the second color conversion table to replace the RGB value of the "adjustment target color" of the first color conversion table with the CMYK value in the CMYK color space.

Note that in some examples the grid point may be adjusted in the CMYK color space instead of, or in addition to, grid point adjustment in the RGB color space. In general, the grid point adjustment may be performed on any color space, such as L*a*b* color space, L*c*h* color space, HSB color space, HSL color space, HSV color space, and the like.

The processor 21 stores the generated third color conversion table in the memory 22. The processor 21 processes the inputted image data by using the third color conversion table stored in the memory 22 for printing.

The processor 21 performs printing by controlling the printer unit 17 to form an image on the print medium based on the image data that has been subjected to the color conversion (ACT 19).

In this manner, the processor 21 generates color conversion information for converting a value of a first color patch (the "color to be adjusted") selected the color patch image into a value of a second color patch (the "adjustment target color") selected the color patch image. The processor 21 performs color conversion on the image data based on the generated color conversion information and controls the printer unit 17 to form an image using the color-converted image data. According to this configuration, if a specific color on the printed matter does not match to the user's preference when output from a different image forming apparatus or the like, it becomes possible to adjust the color to more closely match a desired color without using a specialized device such as a colorimetric apparatus. As a result, it is possible to provide an image forming apparatus capable of performing color adjustment.

The functions described in the above embodiments may be implemented by executing a software program or the like providing instructions for implementing each function. Furthermore, certain or all described functions may be implemented by hardware or combinations of software and hardware.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed:

1. An image forming apparatus, comprising:
    a display;
    a user input device configured to receive user selections;
    a printer unit configured to print images on a print medium according to image data; and
    a processor configured to:
        display a color patch image output screen on the display, the color patch image output screen including user selectable hues;
        receive a selection of a hue from a user via the user input device;
        output a color patch image to the printer unit and cause the printer unit to print the color patch image on a print medium, the color patch image being based on the received selection of the hue and including a plurality of colors indexed by a color number value;
        display a color patch number input screen on the display, the color patch number input screen including a color to be adjusted input field and a target color input field;
        receive a user input of a first color patch number in the color to be adjusted input field and a user input of a second color patch number in the target color input field, the first and second color patch numbers each being color number values included in the color patch image; and
        perform a color conversion on image data so that the color corresponding to the received first color patch number is adjusted to match the color corresponding to the received second color patch number when the printer unit prints an image on another print medium according to the image data.

2. The image forming apparatus according to claim 1, wherein the display is a color display.

3. The image forming apparatus according to claim 1, wherein the user input device comprises a touch panel integrated with the display.

4. The image forming apparatus according to claim 1, wherein the printer unit is a laser printer.

5. The image forming apparatus according to claim 1, wherein the printer unit is configured to form color images with cyan, magenta, yellow, and black toners.

6. The image forming apparatus according to claim 1, wherein the color patch image includes 270 different colors.

7. The image forming apparatus according to claim 1, wherein the color patch image arranges the different colors therein by similarity.

8. The image forming apparatus according to claim 1, further comprising:
 a scanner configured to acquire image data from a document; and
 a communication interface for acquiring image data from a client terminal.

9. The image forming apparatus according to claim 1, wherein the processor is further configured to:
 control the printer unit to print an image on a print medium using the color converted image data.

10. A multifunctional peripheral device, comprising:
 a display;
 a user input device configured to receive user selections;
 a printer configured to print images on a print medium according to image data; and
 a system controller including a processor and memory, the processor configured to:
  display a color patch image output screen on the display, the color patch image output screen including user selectable hues;
  receive a selection of a hue from a user via the user input device;
  output a color patch image to the printer and cause the printer to print the color patch image on a print medium, the color patch image being based on the received selection of the hue and including a plurality of colors indexed by a color number value;
  display a color patch number input screen on the display, the color patch number input screen including a color to be adjusted input field and a target color input field;
  receive a user input of a first color patch number in the color to be adjusted input field and a user input of a second color patch number in the target color input field, the first and second color patch numbers each being color number values included in the color patch image; and
  perform a color conversion on image data so that the color corresponding to the received first color patch number is adjusted to match the color corresponding to the received second color patch number when the printer prints an image on another print medium according to the image data.

11. The multifunctional peripheral device according to claim 10, wherein the display is a color display.

12. The multifunctional peripheral device according to claim 10, wherein the user input device comprises a touch panel integrated with the display.

13. The multifunctional peripheral device according to claim 10, wherein the printer is a laser printer.

14. The multifunctional peripheral device according to claim 10, wherein the printer is configured to form color images with cyan, magenta, yellow, and black toners.

15. The multifunctional peripheral device according to claim 10, wherein the color patch image includes 270 different colors.

16. The multifunctional peripheral device according to claim 10, wherein the color patch image arranges the different colors therein by similarity.

17. The multifunctional peripheral device according to claim 10, further comprising:
 a scanner unit configured to acquire image data from a document; and
 a communication interface for acquiring image data from a client terminal.

18. The multifunctional peripheral device according to claim 10, wherein the system controller is configured to:
 control the printer to print an image on a print medium using the color converted image data.

19. A method for an image forming apparatus, the method comprising:
 displaying a color patch image output screen on a display, the color patch image output screen including user selectable hues;
 receiving a selection of a hue from a user via a user input device;
 outputting a color patch image to a printing unit and causing the printer unit to print the color patch image on a print medium, the color patch image being based on the received selection of the hue and including a plurality of colors indexed by a color number value;
 displaying a color patch number input screen on the display, the color patch number input screen including a color to be adjusted input field and a target color input field;
 receiving a user input of a first color patch number in the color to be adjusted input field and a user input of a second color patch number in the target color input field, the first and second color patch numbers each being color number values included in the color patch image; and
 performing a color conversion on image data so that the color corresponding to the received first color patch number is adjusted to match the color corresponding to the received second color patch number when a printer unit prints an image on another print medium according to the image data.

20. The method of claim 19, further comprising:
 controlling the printer unit to print an image on a print medium using the color converted image data.

* * * * *